US011829939B2

(12) United States Patent
Neumann

(10) Patent No.: US 11,829,939 B2
(45) Date of Patent: Nov. 28, 2023

(54) SYSTEM AND METHODS FOR TRANSFER PATH OPTIMIZATION

(71) Applicant: KPN INNOVATIONS, LLC., Lakewood, CO (US)

(72) Inventor: Kenneth Neumann, Lakewood, CO (US)

(73) Assignee: KPN INNOVATIONS, LLC., Lakewood, CO (US)

( * ) Notice: Subject to any disclaimer, the term of this patent is extended or adjusted under 35 U.S.C. 154(b) by 0 days.

(21) Appl. No.: 17/088,222

(22) Filed: Nov. 3, 2020

(65) Prior Publication Data

US 2022/0138686 A1 May 5, 2022

(51) Int. Cl.
| | |
|---|---|
| *G06Q 10/08* | (2023.01) |
| *G06Q 10/0835* | (2023.01) |
| *G06Q 10/047* | (2023.01) |
| *G06Q 10/0631* | (2023.01) |
| *G01C 21/34* | (2006.01) |
| *G06Q 10/0832* | (2023.01) |
| *G06N 20/00* | (2019.01) |
| *G06N 5/04* | (2023.01) |

(52) U.S. Cl.
CPC ... *G06Q 10/08355* (2013.01); *G01C 21/3453* (2013.01); *G06N 5/04* (2013.01); *G06N 20/00* (2019.01); *G06Q 10/047* (2013.01); *G06Q 10/06315* (2013.01); *G06Q 10/063114* (2013.01); *G06Q 10/0832* (2013.01)

(58) Field of Classification Search
None
See application file for complete search history.

(56) References Cited

U.S. PATENT DOCUMENTS

| | | | |
|---|---|---|---|
| 10,956,855 B1 * | 3/2021 | Coughran | G06Q 10/047 |
| 2015/0227890 A1 * | 8/2015 | Bednarek | G06Q 30/0635 |
| | | | 705/26.81 |
| 2019/0164126 A1 * | 5/2019 | Chopra | G06Q 10/08355 |
| 2019/0228375 A1 * | 7/2019 | Laury | G05D 1/0088 |

(Continued)

OTHER PUBLICATIONS

Leyerer, M., Marc-Oliver Sonneberg, Heumann, M., Kammann, T., & Breitner, M. H. (2019). Individually optimized commercial road transport: A decision support system for customizable routing problems. Sustainability, 11(20), 5544. doi:https://doi.org/10.3390/su11205544 (Year: 2019).*

*Primary Examiner* — Robert D Rines
*Assistant Examiner* — Alissa D Karmis
(74) *Attorney, Agent, or Firm* — CALDWELL INTELLECTUAL PROPERTY LAW

(57) ABSTRACT

A system for transfer path optimization is disclosed. The system comprises a computing device configured to receive a plurality of inputs from a user device at a current geographical location. The computing device is configured to generate a plurality of originators as function of the plurality of inputs, by identifying originators within a threshold distance relative to current geographical location of the user device. The computing device is configured to generate a fast transfer path. Computing device is configured to pair the fast transfer path with the first component and to assign a transfer agent to the fast transfer path. Computing device is configured to generate a second component path to transfer the second component. A method for transfer path optimization is also disclosed.

16 Claims, 6 Drawing Sheets

(56) References Cited

U.S. PATENT DOCUMENTS

| | | | |
|---|---|---|---|
| 2019/0266557 A1* | 8/2019 | Berk | G06Q 50/12 |
| 2021/0133677 A1* | 5/2021 | Fu | G06Q 10/08355 |
| 2021/0142248 A1* | 5/2021 | Balva | G06Q 10/06315 |

* cited by examiner

SYSTEM AND METHODS FOR TRANSFER PATH OPTIMIZATION

FIELD OF THE INVENTION

The present invention generally relates to the field of optimization. In particular, the present invention is directed to system and methods for transfer path optimization.

BACKGROUND

Efficient path selection to deliver goods, such as consumer goods, is an increasingly vital process for provisioning of many types of goods. However, existing methods for path selection suffer from inaccuracy in predictions used to support further computations.

SUMMARY OF THE DISCLOSURE

In an aspect, a system for transfer path optimization is disclosed. The system comprises a computing device configured to receive a plurality of inputs from a user device at a current geographical location. The plurality of inputs comprises a first component requiring an accelerated delivery, a second component not requiring accelerated delivery, and a destination. The computing device is configured to generate a plurality of originators as a function of the plurality of inputs, by identifying originators within a threshold distance relative to current geographical location of the user device. The computing device is configured to generate a fast transfer path, where generating a fast transfer path includes generating a plurality of transfer paths for each originator in the plurality of originators as a function of the destination; determining a time to destination for each transfer path of the plurality of transfer paths; ordering each of the transfer paths of the plurality of transfer paths as a function of the ordering; scoring each transfer path of the plurality of transfer path as a function of the ordering; and assigning the fast transfer path to a highest score as a function of the scoring Computing device is configured to pair the fast transfer path with the first component and to assign a transfer agent to the fast transfer path. Computing device is configured to generate a second transfer path to transfer the second component.

In another aspect, a method for transfer path optimization is disclosed. The method receives by a computing device, a plurality of inputs from a user device at a current geographical location. The plurality of inputs comprises a first component requiring an accelerated delivery, a second component not requiring accelerated delivery, and a destination. The method generates, by the computing device, a plurality of originators as a function of the plurality of inputs, by identifying originators within a threshold distance relative to the current geographical location to the user device. The method generates by the computing device, a fast transfer path, where generating the fast transfer path includes generating a plurality of transfer paths for each originator in the plurality of originators as a function of the destination; determining a time to destination for each transfer path of the plurality of transfer paths; ordering each of the transfer paths of the plurality of transfer paths as a function of a respective time to destination; scoring each transfer path of the plurality of transfer path as a function of the ordering and assigning the fast transfer path to a highest score as a function of the scoring. The method pairs by computing device, the fast transfer path with the first component. The method assigns by the computing device, a transfer agent to the fast transfer path. The method generates, by the computing device, a second transfer path to transfer the second component.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for transfer path optimization. A plurality of originators is generated that fall within a threshold distance to a user device. A fast transfer route is generated that is assigned to a component that may require accelerated delivery. A transfer agent is assigned to the fast transfer route. A second transfer path for a second component which does not require accelerated delivery is generated.

Practical applications of this disclosure include the generation of a fast transfer path for items that may require accelerated delivery transfer of a component due to the nature of the component. Another practical application includes an option for accelerating transfer of items not requiring accelerated delivery.

Figure 1:
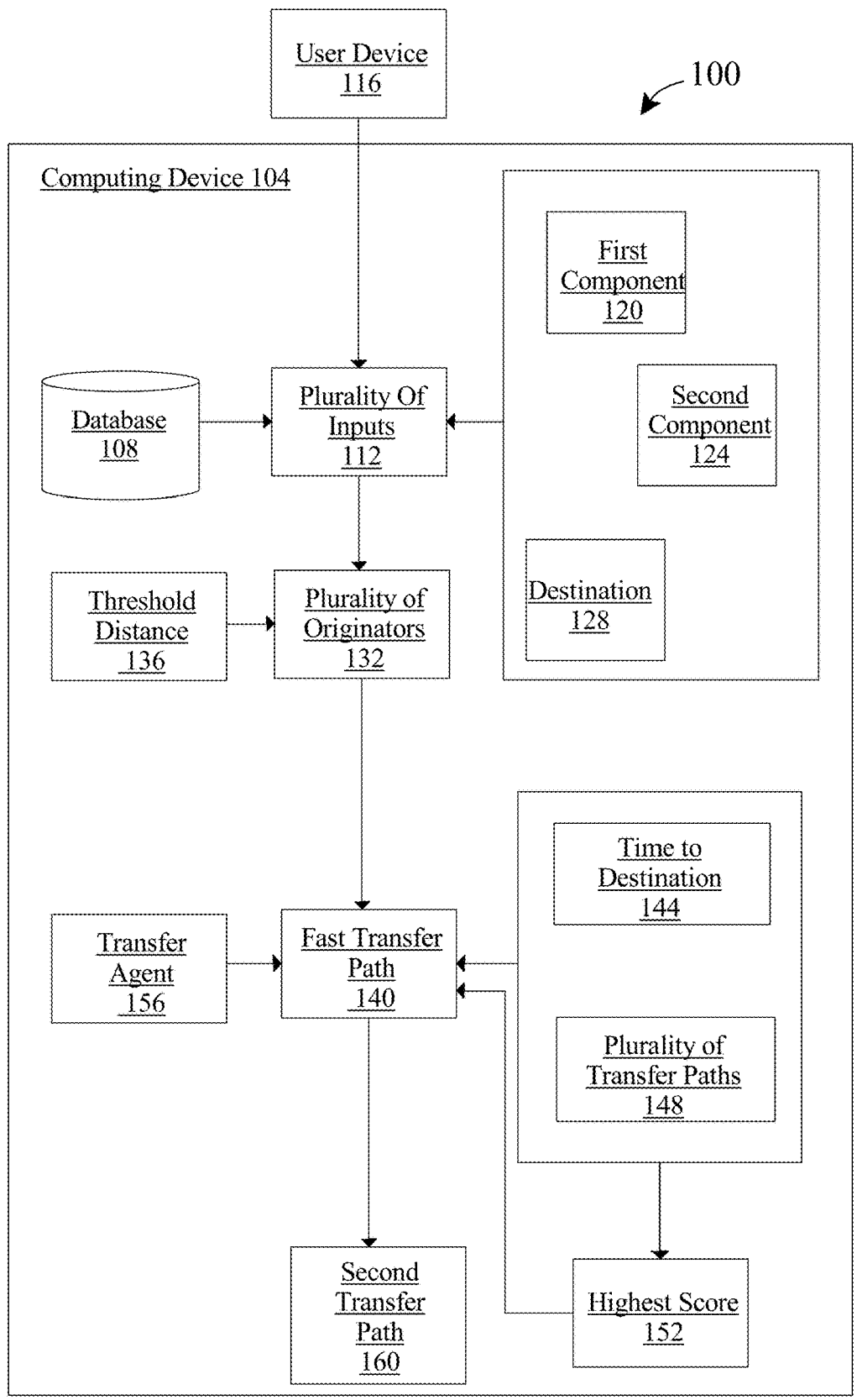
FIG. 1 is a block diagram of an exemplary embodiment of a system of optimizing a transfer path.

Referring now to FIG. 1, an exemplary embodiment of a system 100 for selecting an alimentary provider is illustrated. System includes a computing device 104. Computing device 104 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device 104 may include a single computing device operating independently, or may include two or more computing device operating in concert, in parallel, sequentially or the like; two or more computing devices may be included together in a single computing device or in two or more computing devices. Computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device 104 may include but is not limited to, for example, a computing device or cluster of computing devices in a first location and a second computing device or cluster of computing devices in a second location. Computing device 104 may include one or more computing devices dedicated to data storage, security, distribution of traffic for load balancing, and the like. Computing device 104 may distribute one or more computing tasks as described below across a plurality of computing devices of computing device, which may operate in parallel, in series, redundantly, or in any other manner used for distribution of tasks or memory between computing devices. Computing device 104 may be implemented using a "shared nothing" architecture in which data is cached at the worker, in an embodiment, this may enable scalability of system 100 and/or computing device.

Computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, computing device 104 may connect to and/or include a database 108. Database 108 may be implemented, without limitation, as a relational database 108, a key-value retrieval database 108 such as a NOSQL database 108, or any other format or structure for use as a database 108 that a person skilled in the art would recognize as suitable upon review of the entirety of this disclosure. Database 108 may alternatively or additionally be implemented using a distributed data storage protocol and/or data structure, such as a distributed hash table or the like. Database 108 may include a plurality of data entries and/or records as described above. Data entries in a database 108 may be flagged with or linked to one or more additional elements of information, which may be reflected in data entry cells and/or in linked tables such as tables related by one or more indices in a relational database 108. Persons skilled in the art, upon reviewing the entirety of this disclosure, will be aware of various ways in which data entries in a database 108 may store, retrieve, organize, and/or reflect data and/or records as used herein, as well as categories and/or populations of data consistently with this disclosure. In some embodiments, network data, or other information such as user information, transfer party information, and alimentary provider information, may be stored in and/or retrieved from database 108.

Figure 2:
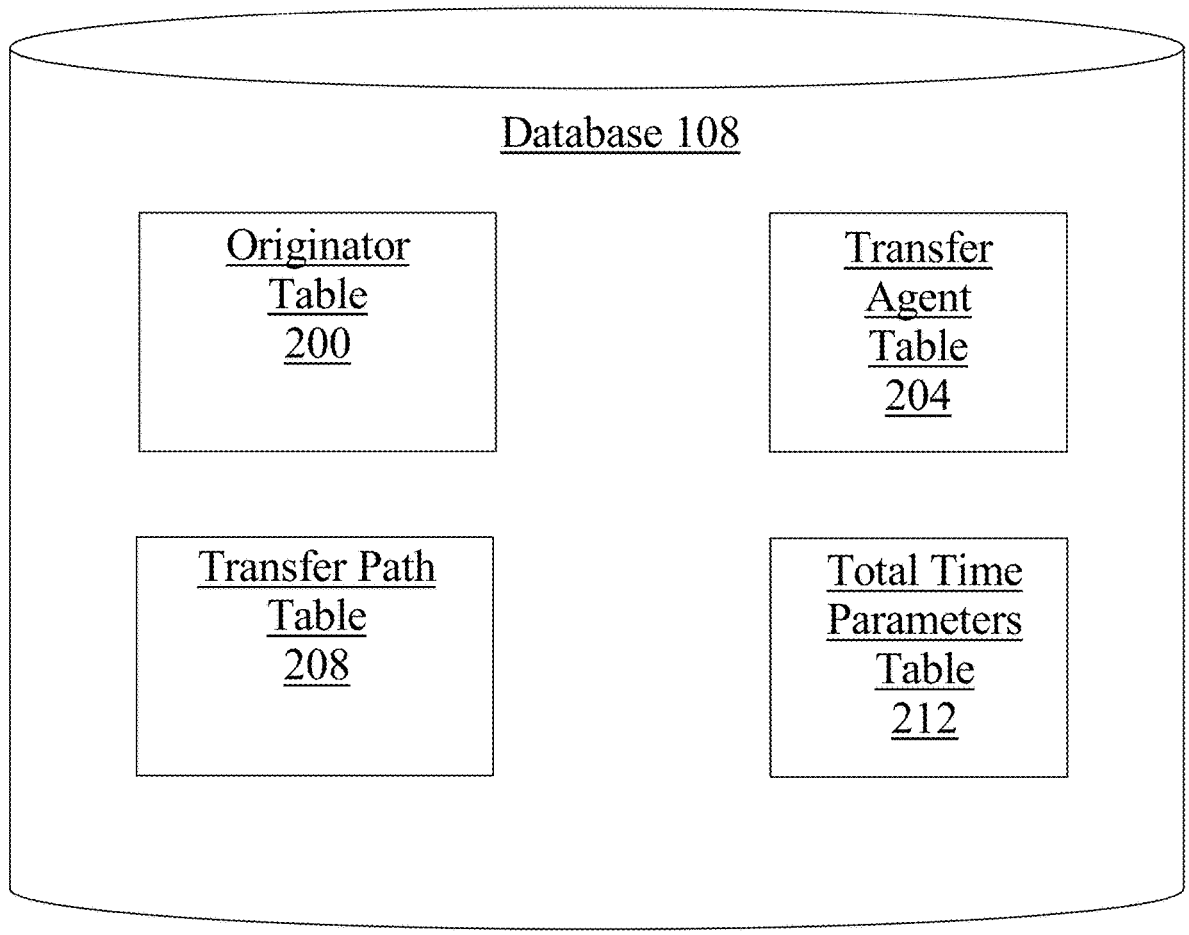
FIG. 2 is a block diagram of an exemplary embodiment of a database.

Referring now to FIG. 2 an exemplary embodiment of a database 108 is illustrated. Database 108 may, as a non-limiting example, organize data stored in the database according to one or more database tables. One or more database tables may be linked to one another by, for instance, common column values. For instance, a common column between two tables of database 108 may include an identifier of alimentary providers, for instance as defined below; as a result, a query may be able to retrieve all rows from any table pertaining to a given alimentary provider. Other columns may include any other category usable for organization or subdivision of data, including types of data, common pathways between, for example, an alimentary combination and a first alimentary provider, or the like; persons skilled in the art, upon reviewing the entirety of this disclosure, will be aware of various ways in which expert data from one or more tables may be linked and/or related to expert data in one or more other tables.

Still referring to FIG. 2, one or more database tables in database 108 may include, as a non-limiting example, an originator table 200, which may be used to store records and attributes related to originators. This may include, but not limited to, names of originators, type of components provided, or the like. As another non-limiting example, one or more tables in database 108 may include an transfer agent table 204 which may be used to store information such as type of transfer agent, names, contact information, safety record, and the like As another non-limiting example, one or more tables in database 108 may include a transfer path table 208. A transfer path table 208 may include, but not limited to historical information regarding paths between originators and destinations, historical conditions for the paths, and the like. As another non-limiting example, one or more tables in database 108 may include a total time parameters table 212. A total time parameter table 212 may include parameters that may impact the transfer path, such as, but not limited to, potential detours due to activity in the transfer path, times where the path is likely to be congested, and the like.

With continued reference to FIG. 1, computing device 104 may be configured to receive a plurality of inputs 112 from a user device 116 at a current geographical location. The plurality of inputs 112 may include a first component 120 requiring accelerated delivery, a second component 124 not requiring accelerated delivery, and a destination 128. A "user device," as used in this disclosure, is any device that a user may use to enter an input. This may include, but it is not limited to, a cell phone, a tablet computer, a laptop computer, a desktop computer, and the like. User device 116 may have the capability to connect to the Internet. The user device may be configured to use a wireless network using Wi-Fi and any available communication standard such as, for example, IEEE 802.11. User device 116 may be configured to connect to a short-range network using, for example, Bluetooth® technology. User device 116 may be configured to access a network by connecting using a wired network connection using, for example, an Ethernet connection. As used in this disclosure, a "current geographical location" is defined as a specific location, region, or place where user device 116 is located. The current geographical location may be, for example, a street, a city, a point of interest, a latitude and longitude coordinates, and the like. The location of user device 116 may be tracked by by a Global Positioning System (GPS) and used to establish the current geographical location. A "component," as used in this disclosure may be any item or goods where a user may want deliver to a destination. Examples of components include, but are not limited to, food items that may include snacks, beverages which may include hot or cold beverages like milk, coffee, any alimentary combination that may constitute a full meal where the alimentary combination may be delivered hot or cold, and the like. The component may also include a medication which may include prescription or non-prescription medications. The component may include grocery items which may include, but not limited to, fruits, vegetable, dairy products, deli meats, items deriving from meats or fish, baked good, and the like. As used in this disclosure, items requiring "accelerated delivery" are items that receive a higher priority when a transfer is requested. Items may require accelerated delivery if, for example, they are perishable. Items may also require accelerated delivery if a user needs a medication accelerated to treat a health condition, such as a medication to treat an adverse reaction to a chemotherapy. Items may include, but it is not limited to, perishable items, medication required by a patient for immediate intake, items where the user requests "accelerated delivery," and the like. A destination of the item may be any location where the user may want a transfer of the component to occur. For example, the user may want to have a food item delivered to a residence, or a business address may be chosen. Other examples of a destination for the component include, but are not limited to an event, a college dormitory, or the like. As an example, a user may order a pepperoni pizza from a pizza restaurant by interacting with user device 116. User may select to have the pizza delivered to a destination for the alimentary combination, such as but not limited to, the user's residence, the user's workplace, or the like. The delivery may take place by transfer party directly employed by the alimentary provider.

Still with reference to FIG. 1, computing device 104 may be configured to generate a plurality of originators 132 as function of the plurality of inputs 112. An "originator" as used in this disclosure, is any provider that is capable of providing the first component and/or the second component. An originator may have a physical establishment or may be virtually located in the internet. The plurality of originators 132 may be identified by having a location within a threshold distance 136 of the current geographical location of the user device 116. The plurality of originators 132 may be based on the component requested by the user. For example, a pharmacy or a retail store with a pharmacy group may become an originator where the component includes a medication. Plurality of originators 132 may include grocery stores or hypermarkets if the component includes grocery items. Plurality of originators 132 may include the same originators for different components if, for example, one originator can serve as the originator for multiple components. As used in this disclosure, a "threshold distance" is a value, in miles, that is either manually entered by the user or automatically selected by computing device 104 based on user history which serves as the maximum distance between plurality of originators 132 and user device 116. In a non-limiting example, computer device 104 may default to a threshold distance 136 of "0.5 miles." Using threshold distance 136 of 0.5 miles will output a plurality of originators 132 as a function of the input which are within 0.5 miles of user device 116. The user may customize and expand the threshold distance 136 to, for example, "10 miles" where computing device will output alimentary provider candidates 120 as a function of the input which are within 10 miles of user device 116. A user may enter a range of values for the threshold distance. For example, a user may enter "0.5-1.0 miles which will output alimentary provider candidates that are within 0.5 and 1.0 miles of user device 116.

With continued reference to FIG. 1, computing device 104 may be configured to generate a fast transfer path 140. The determination and optimization of transfer routes may be implemented, without limitation, as disclosed in U.S. Nonprovisional application Ser. No. 16/890,339, filed on Jun. 2, 2020, and entitled, "METHODS AND SYSTEMS FOR PATH SELECTION USING VEHICLE ROUTE GUIDANCE," and U.S. Nonprovisional application Ser. No. 16/919,573, filed on Jul. 2, 2020, and entitled "A METHOD AND SYSTEM FOR SELECTION OF A PATH DELIVERIES;" each of U.S. Nonprovisional application Ser. No. 16/890,339 and U.S. Nonprovisional application Ser. No. 16/919,573 is incorporated by reference herein in its entirety. As used in this disclosure, a "fast transfer path" is defined as any route, or any avenue by which a component may be transferred to the destination in the shortest possible amount of time, where possible amounts of time correspond to times of traversal in a list of possible transfer paths. Fast transfer path 140 may include a ground path. Ground paths may include paved or unpaved roads. Fast transfer path 140 may include an aerial path. An aerial path may be used by, for example, a drone, to transfer a component. Fast transfer path 140 may include a maritime path which may be used by a water vessel to deliver the component. Fast transfer path 140 may include a combination of ground, aerial, and maritime. Computing device 104 may generate a plurality of transfer paths 148 for each originator in plurality of originators 132 as a function of destination 128. Based on the destination of the component, computing device will determine various paths to reach the destination. Plurality of transfer paths 148 may include a compound transfer path where various components transferred to different destinations may be transferred within one transfer. Computing device 104 may determine time to destination 144 for each transfer path of the plurality of transfer paths 148. Based on the distance to destination 128, computing device will determine the time to destination 144, in minutes, with an origin at the plurality of originators 132. Multiple paths from, for example, an originator in the plurality of originators, may be determined to reach destination 128. In an embodiment, the user may configure to display the distance from the originator to the destination. In another embodiment, the user may configure to display the distance in miles or in kilometers. Computing device 104 may rank each of the transfer paths of plurality of transfer paths 136 as a function of increasing time to the destination. As an example, the path that takes the shortest amount of time will be ranked higher than a path that takes a longer amount of time. A path to destination 128 which is longer when measured by distance, but that takes a shorter amount of time to reach, will be ranked higher than a path that is shorter in distance, but that it may take longer to reach. Computing device 104 may score each transfer path of the plurality of transfer paths as a function of the rank, where a transfer path with the lowest time to destination receives a highest score 152. A score of a particular path may be computed based on a combination of one or more factors which may include, but not limited to, preference of the path, historical values of the score of the path, on time arrival percent of transfer of component, and the like. Each factor may be assigned a score based on a predetermined variable. Each factor may be weighted or unweighted. Computing device 104 may assign the fast transfer path 140 highest score 152. Once the factors are determined and a score computed, fast transfer path 140 is assigned to the highest score.

In an embodiment, generating fast transfer path 140 may include receiving at least a transfer. As used in this disclosure, a "transfer parameter" is defined as a criterion that may impact a transfer path. For example, traffic conditions or a weather event may adversely impact the score calculation for the determination of fast transfer path 140. Such events may negatively impact the score in the determination of fast transfer path 140. Additionally, computing device 104 may train a machine-learning process using transfer parameter training data correlating transfer parameter to the time of destination. The machine-learning process will be described below.

Figure 3:
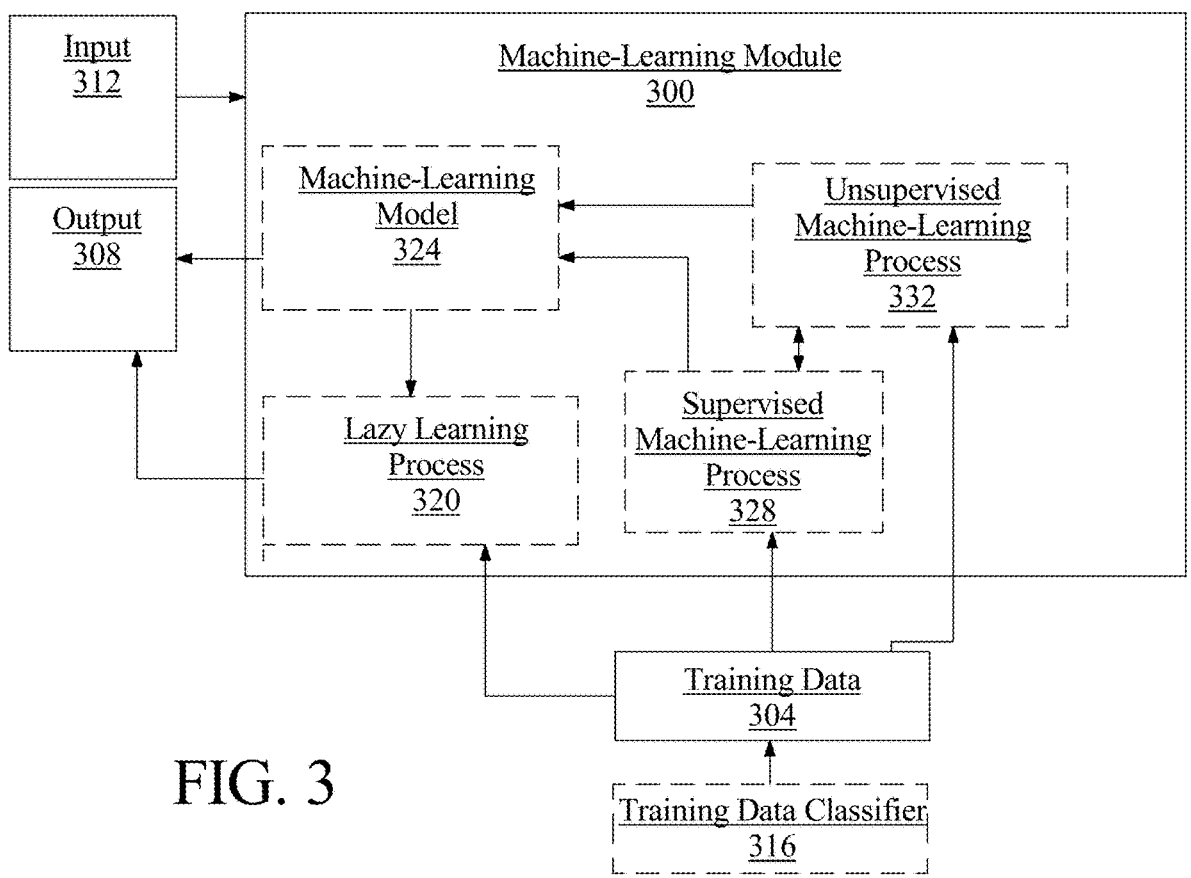
FIG. 3 is a block diagram of an exemplary embodiment of a machine-learning module.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm that will be performed by a computing device/module to produce outputs 308 given data provided as inputs 312; this is in contrast to a non-machine learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 304 may include a plurality of data entries, each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure. As a non-limiting illustrative example, a component may require a special resource for transfer such as a refrigerated vehicle. The machine-learning process may be trained with training data correlating transfer agents with resources. The machine learning process may input a required resource, and it may output a plurality of transfer agent with the required resource.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 300 may generate a classifier using a classification algorithm, defined as a process whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 316 may classify elements of training data to As discussed in the example above, the resources may be classified so as to output transfer agents with resources, where the resource is, for example, a refrigerated truck.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 3, machine-learning processes as described in this disclosure may be used to generate machine-learning models 324. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include a plurality of paths to a particular destination as described above as inputs, fast transfer paths with a certain score as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes. Computing device 104 may update the score as a function of the at least the transfer parameter and the machine-learning process.

Referring back to FIG. 1, in an embodiment, generating the fast transfer path may include generating an objective function based on the plurality of objectives and pairing, with the transfer agent, a predicted transfer path that optimizes the objective function. An "objective function," as used in this disclosure, is a mathematical function used by a computing device 104 to score a quantitative element or objectives which may include, for example, the factors involved in the scoring of fast transfer path 140 or the time to destination. A machine-learning process may use, for instance, time to destination data correlating originator and transfer path to transfer time and train a machine-learning model to output a plurality of times based on originator and the transfer path. An objective function may then be optimized. In various embodiments a score of a particular factor, such as the score to determine fast transfer path 140 may be based on a combination of one or more factors. Each factor may be assigned a score based on predetermined variables, for example, a preferred route may be scored higher than a non-preferred route. In some embodiments, the assigned scores may be weighted or unweighted. Computing device 104 may compute a score associated with each factor and select factors to minimize and/or maximize the score, depending on whether an optimal result is represented, respectively, by a minimal and/or maximal score. Objective function may be formulated as a linear objective function, which computing device 104 may solve using a linear program such as without limitation a mixed-integer program. A "linear program," as used in this disclosure, is a program that optimizes a linear objective function, given at least a constraint. For instance, transfer parameters may be constrained to values that may impact the selection of a transfer path based on the transfer parameter. In various embodiments, system 100 may determine scores that maximizes a total score subject to at least a constraint.

With continued reference to FIG. 1, optimizing objective function may include minimizing a loss function, where a "loss function" is an expression an output of which an optimization algorithm minimizes to generate an optimal result. As a non-limiting example, computing device 104 may assign variables relating to a set of parameters, which may correspond to score components as described above, calculate an output of mathematical expression using the variables, and select score that produces an output having the lowest size, according to a given definition of "size," of the set of outputs representing each of plurality of candidate ingredient combinations; size may, for instance, included absolute value, numerical size, or the like. Selection of different loss functions may result in identification of different factors as generating minimal outputs.

With continued reference to FIG. 1, computing device 104 may pair fast transfer path 140 with first component 120. As an example, first component 120 may include a perishable component that may require an accelerated transfer to destination 128. For instance, a medication that requires refrigeration may require an accelerated transfer over medication not requiring refrigeration. In another non-limiting example, an uncooked food preparation that uses raw milk as an ingredient, may require an accelerated transfer over a cooked food preparation that uses raw milk. To expedite delivery of, for example, a first component that may be perishable, fast transfer path 140 may be assigned to first component 120.

Still with reference to FIG. 1, computing device 104 may assign a transfer agent 156 to fast transfer path 140. A "transfer agent," as defined in this disclosure, is a person and/or device that transports a component to one or more users requesting the component. Transfer agents may be on foot, or traveling by vehicle, such as a car, scooter, bicycle, etc. Transfer agents may include an autonomous vehicle, a drone, or the like. One or more transfer agents may be directed to one or more originators to receive an order placed by users and transfer the orders to the users located at corresponding destinations, which may include without limitation residential or commercial addresses. In an embodiment, computing device 104 may pair a fast transfer path 140 with a transfer agent by identifying a plurality of currently active transfer agents including the transfer agent and assigning fast transfer path 140 to the transfer agent 156, As used in this disclosure, a "currently active" transfer agent is an agent that is available and physically able for assignment of the fast transfer path. For example, an originator may use a third party to request a transfer agent. The third party may need a transfer agent to be "logged into" a system to be available to make transfers. In another non-limiting example, transfer agents may be listed in an inventory of transfer agents. The plurality of currently active transfer agents may be included in, for example, an active transfer agent table in database 108. Plurality of originators 132 may also provide their own transfer agents that may be used to pair those transfer agents to a transfer path. Pairing of transfer path to transfer agent may involve determining the load of transfer agent 156. For example, a transfer agent may already have several transfers to fulfill whereas adding another transfer to the transfer agent may increase the time of transfer of all components. Pairing fast transfer path 140 with a different transfer agent may help optimize transfer times. Once transfer agent 156 receives fast transfer path 140, the transfer agent may decline to transfer a component or use fast transfer path 140. Computing device 104 may select an alternate fast transfer path. Alternatively, computing device 104 may select an alternate transfer agent.

Figure 4:
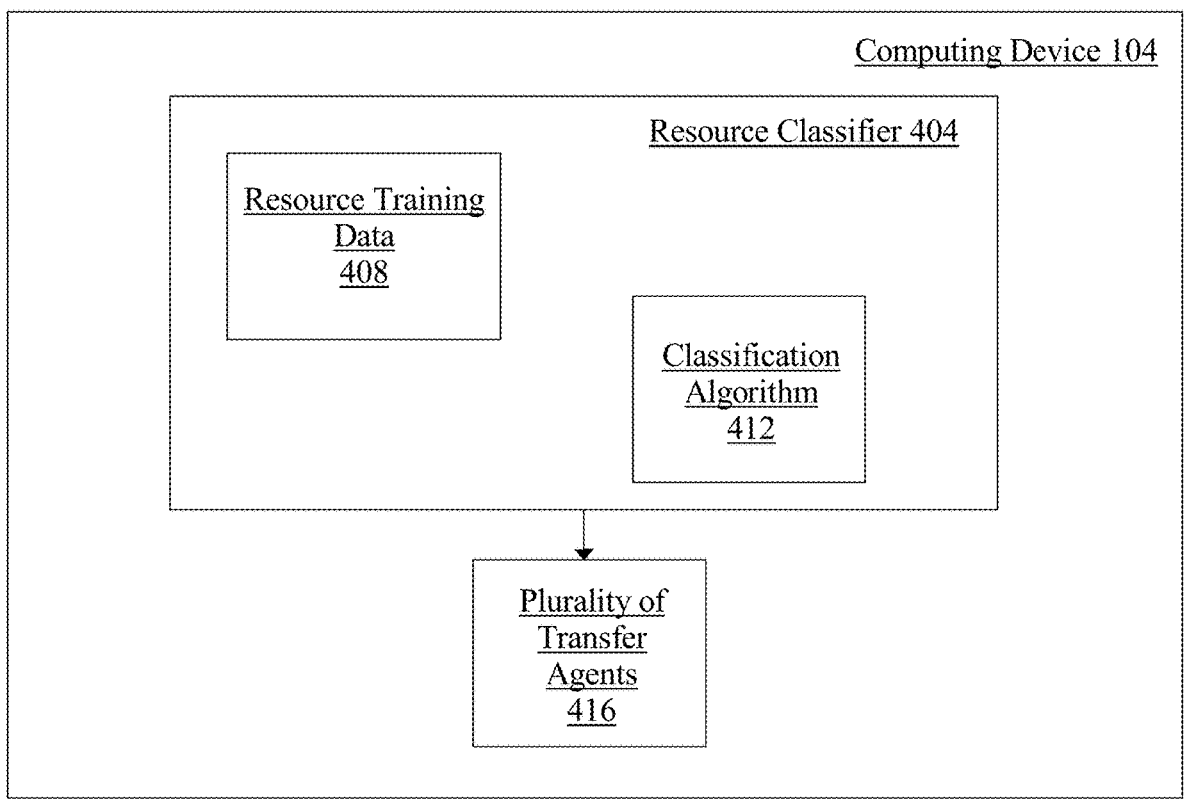
FIG. 4 is a block diagram of an exemplary embodiment of a determination of a determination of a plurality of transfer agent as a function of resources.

Referring now to FIG. 4, an exemplary embodiment where assigning the fast transfer path 140 to transfer agent 156 as a function of resource classifier 404 is illustrated. Assigning transfer agent 156 to fast transfer path 140 may be constrained by resources. Use and description of classifier was provided in FIG. 3 of this disclosure. A "resource," as used in this disclosure, is a supply of an asset for the transfer to occur effectively. A resource may include, for example, a transfer mode which is equipped properly to transfer the component. For example, a perishable item may require the use of, for example, of an asset such as refrigerated truck. Hot items, such as a pizza, may require an asset such as a vehicle that includes an external heating unit. The generation of a classifier with training data is described earlier in FIG. 3 of this disclosure. The classification of transfer agent 156 includes generating resource classifier 404 using a classification algorithm and using resource training data 408 correlating transfer agents with resources. Resource training data 408 may be developed based on historical pairings of transfer agent with resources. Resource training data 408 may be updated and resource classifier 404 retrained to account for new transfer agent or transfer agents that no longer have the resource available. Use and description of classification algorithms was provided in FIG. 3 of this disclosure. The classification may include generating a plurality of transfer agents 416 with a resource as a function of resource classifier 404.

In addition, and with continued reference to FIG. 1, computing device 104 may generate a second transfer path 160 to transfer second component 124. For example, in an embodiment, to generate second transfer path 160, computing device 104 may select a second transfer path 160 from the plurality of transfer paths from the location of the originator to the destination. In a non-limiting example, computing device 104 may be configured to select second transfer path 160 by training a machine-learning process using path training data. Path training data may correlate the current geographical location of plurality of originators 132 with a path to a destination. The machine-learning process may use destination as inputs with second transfer path 160 as outputs. Machine-learning processes have been described earlier in this disclosure. Alternatively, computing device 104 may select second transfer path 160 from transfer path table 208 in database 108 to obtain second transfer path 160. Computing device 104 may pair a second transfer agent with the second component transfer path. Computing device 104 may pair second transfer path 160 with a second transfer agent by identifying a plurality of currently active transfer agent and assign second transfer path 160 to a transfer agent. The plurality of currently active transfer agents may be included in, for example, an active transfer agent table in database 108. Originators may also provide their own transfer agents that may be used to pair those transfer agents to a second transfer path 160. Pairing of transfer path to a transfer party may involve, for example, determining the location of the transfer agent as a function of the originator and the location of the user device 116. Pairing of transfer path to transfer party may involve determining the load of the transfer agent. For example, a transfer agent may already have several transfers to fulfill whereas adding another transfer to the transfer agent may increase the time of transfer of all components. Pairing the route with a different transfer agent may help optimize transfer times.

Continuing with reference to FIG. 1, computing device 104 may be configured where an input from the plurality of inputs 112 includes an expedited option. As used in this disclosure, an "expedited option" prioritizes a second component and schedules the second component for accelerated delivery. For example, a user may indicate as an input for a second component, where a second component includes grocery items. The user may select the second component for accelerated delivery. Selecting the expedited option may incur additional fees for the user. As both the first component and the second component require accelerated delivery, computing device 104 pairs the fastest transfer path with the first component and the second component. The determination of the fastest transfer path was discussed earlier in this disclosure.

With continued reference to FIG. 1, computing device 104 may be configured to display the time to destination of the fast transfer path on the user device. For example, user device 116 may visually see the location of the originator relative to the destination in a map. The map may show a header, such as, but not limited to, "Time to Destination=30 minutes." The user may see, for example, a change in color of the time if there is a delay in the time to destination as a result of traffic or other events that may impact the time to destination. A change to red may indicate a delay of longer than 15 minutes while a change to yellow may indicate a delay of between 5 and 14 minutes. A green color may indicate an on-time status. In another embodiment, computing device 104 may be configured to display the fast transfer path on the user device. As an example, the user may see the fast transfer path indicate visually different, for example, bolded in a map. The display may show the fast transfer path and the time to destination simultaneously in the user device. In an embodiment, the user may configure the device to display both the fast transfer path and the time to destination, either the fast transfer path or the time to destination, or neither the fast transfer path nor the time to destination.

Figure 5:
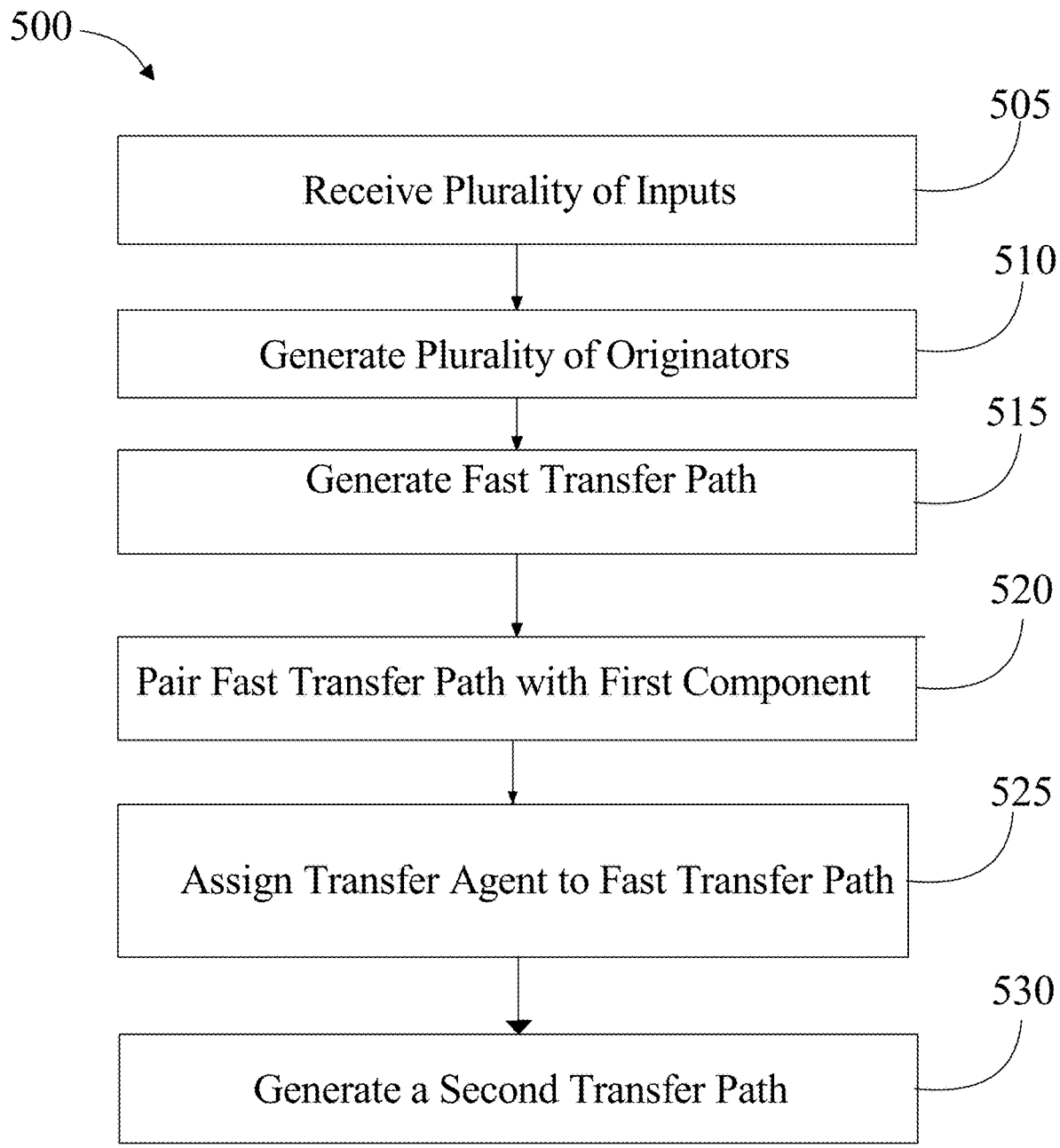
FIG. 5 is a flow diagram illustrating an exemplary embodiment of a method of optimizing a transfer path.

Referring now to FIG. 5, an exemplary method 500 for transfer path optimization is illustrated. At step 505, a computing device receives a plurality of inputs from a user device, where the plurality of input comprises a first component requiring an accelerated delivery, a second component not requiring accelerated delivery, and a destination. This step may be implemented, without limitation, as described in FIGS. 1-4.

With continued reference to FIG. 5, at step 510, the computing device generates a plurality of originators as a function of the plurality of inputs, by identifying originators having a location within a threshold distance of the current geographical location of the user device. This step may be implemented, without limitation, as described in FIGS. 1-4.

With continued reference to FIG. 5, at step 515, the computing device generates a fast transfer path, where generating the fast transfer path includes generating a plurality of transfer paths for each originator of the plurality of originators as a function of the destination; determine a time to destination for each transfer path of the plurality of transfer paths; ordering each transfer path of the plurality of transfer paths as a function of a respective time to the destination; scoring each transfer path as a function of the ordering. This step may be implemented, without limitation, as described in FIGS. 1-4. Generating a fast transfer path may further include receiving at least a transfer; training a machine-learning process using transfer parameter training data correlating transfer parameter to the time to destination; and updating the score as a function of the at least the transfer parameter and the machine learning process.

Additionally or alternatively, with continued reference to FIG. 5, generating a fast transfer path may include generating an objective function based on a plurality of objectives; and pairing, with the transfer agent, a predicted transfer path that optimizes the objective function.

With continued reference to FIG. 5, at step 520, the computing device may pair the fast transfer path with the first component. This step may be implemented, without limitation, as described in FIGS. 1-4.

With continued reference to FIG. 5, at step 525, the computing device may assign a transfer agent to the fast transfer path. This step may be implemented, without limitation, as described in FIGS. 1-4. Assigning the transfer agent to the transfer path may include classifying the transfer agent. Classifying the transfer agent, may include generating a resource classifier using a classification algorithm and using resource training data correlating transfer agents with resources; and generating a plurality of transfer agents with a resource as a function of the resource classifier. This step may be implemented, without limitation, as described in FIGS. 1-4. The resource may include a transfer mode. In an embodiment, an input from the plurality of inputs, comprises an expedited delivery option and pairing the fastest transfer path with the first component and the second component. Inputting an expedited delivery option will trigger a component, for example a second component 124 to require accelerated delivery.

Additionally or alternatively, and with continued reference to FIG. 5, assigning the transfer the transfer agent to the fast transfer path may include identifying a plurality of currently active transfer agents including the transfer agent; and assigning the fast transfer path to the transfer agent. This step may be implemented, without limitation, as described in FIGS. 1-4.

With continued reference to FIG. 5, at step 530, computing device may generate a second transfer path to transfer the second component. This may be implemented, without limitations, as described in FIGS. 1-4. Generating a second transfer path to transfer the second component may include selecting a second transfer path from the plurality of transfer paths from the location of the originator to the destination; and pairing a second transfer agent with the second transfer path.

Additionally or alternatively, with continued reference to FIG. 5, in an embodiment, computing device may display the time to destination of the first transfer path on the user device. In another embodiment, computing device may display the fast transfer path on the user device. This may be implemented, without limitation, as described in FIGS. 1-4.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 6:
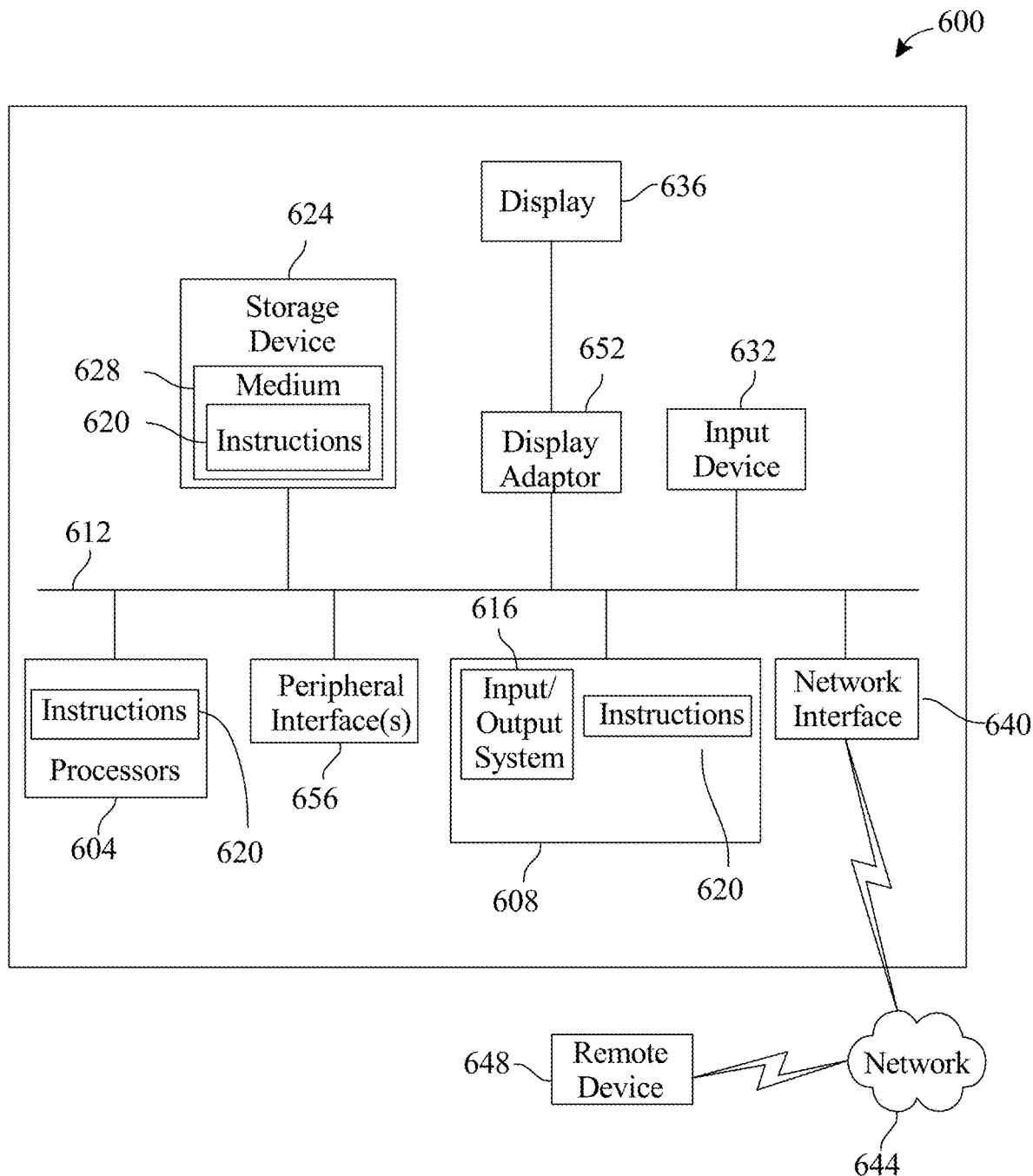
FIG. 6 is a block diagram of a computing system that can be used to implement any one or more of the methodologies disclosed herein and any one or more portions thereof.

FIG. 6 shows a diagrammatic representation of one embodiment of a computing device in the exemplary form of a computer system 600 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 600 includes a processor 604 and a memory 608 that communicate with each other, and with other components, via a bus 612. Bus 612 may include any of several types of bus structures including, but not limited to, a memory bus, a memory controller, a peripheral bus, a local bus, and any combinations thereof, using any of a variety of bus architectures.

Processor 604 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 604 may be organized according to Von Neumann and/or Harvard architecture as a non-limiting example. Processor 604 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC)

Memory 608 may include various components (e.g., machine-readable media) including, but not limited to, a random-access memory component, a read only component, and any combinations thereof. In one example, a basic input/output system 616 (BIOS), including basic routines that help to transfer information between elements within computer system 600, such as during start-up, may be stored in memory 608. Memory 608 may also include (e.g., stored on one or more machine-readable media) instructions (e.g., software) 620 embodying any one or more of the aspects and/or methodologies of the present disclosure. In another example, memory 608 may further include any number of program modules including, but not limited to, an operating system, one or more application programs, other program modules, program data, and any combinations thereof.

Computer system 600 may also include a storage device 624. Examples of a storage device (e.g., storage device 624) include, but are not limited to, a hard disk drive, a magnetic disk drive, an optical disc drive in combination with an optical medium, a solid-state memory device, and any combinations thereof. Storage device 624 may be connected to bus 612 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 624 (or one or more components thereof) may be removably interfaced with computer system 600 (e.g., via an external port connector (not shown)). Particularly, storage device 624 and an associated machine-readable medium 628 may provide nonvolatile and/or volatile storage of machine-readable instructions, data structures, program modules, and/or other data for computer system 600. In one example, software 620 may reside, completely or partially, within machine-readable medium 628. In another example, software 620 may reside, completely or partially, within processor 604.

Computer system 600 may also include an input device 632. In one example, a user of computer system 600 may enter commands and/or other information into computer system 600 via input device 632. Examples of an input device 632 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 632 may be interfaced to bus 612 via any of a variety of interfaces (not shown) including, but not limited to, a serial interface, a parallel interface, a game port, a USB interface, a FIREWIRE interface, a direct interface to bus 612, and any combinations thereof. Input device 632 may include a touch screen interface that may be a part of or separate from display 636, discussed further below. Input device 632 may be utilized as a user selection device for selecting one or more graphical representations in a graphical interface as described above.

A user may also input commands and/or other information to computer system 600 via storage device 624 (e.g., a removable disk drive, a flash drive, etc.) and/or network interface device 640. A network interface device, such as network interface device 640, may be utilized for connecting computer system 600 to one or more of a variety of networks, such as network 644, and one or more remote devices 648 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 644, may employ a wired and/or a wireless mode of communication. In general, any network topology may be used. Information (e.g., data, software 620, etc.) may be communicated to and/or from computer system 600 via network interface device 640.

Computer system 600 may further include a video display adapter 652 for communicating a displayable image to a display device, such as display device 636. Examples of a display device include, but are not limited to, a liquid crystal display (LCD), a cathode ray tube (CRT), a plasma display, a light emitting diode (LED) display, and any combinations thereof. Display adapter 652 and display device 636 may be utilized in combination with processor 604 to provide graphical representations of aspects of the present disclosure. In addition to a display device, computer system 600 may include one or more other peripheral output devices including, but not limited to, an audio speaker, a printer, and any combinations thereof. Such peripheral output devices may be connected to bus 612 via a peripheral interface 656. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for transfer path optimization, the system comprising:
a computing device configured to:
receive a plurality of inputs from a user device at a current geographical location, wherein the plurality of inputs comprises:
a first component requiring an accelerated delivery;
a second component not requiring accelerated delivery; and
a destination;
generate a plurality of originators as a function of the plurality of inputs by identifying originators within a threshold distance relative to the current geographical location of the user device;
generate a fast transfer path, wherein generating the fast transfer path comprises:
generating a plurality of transfer paths for each originator of the plurality of originators as a function of the destination;
determining a time to destination for each transfer path of the plurality of transfer paths;
ordering each of the transfer paths of the plurality of transfer paths as a function of a respective time to destination;
scoring each transfer path of the plurality of transfer paths as a function of the ordering; and
receiving at least one transfer parameter;
generating a machine-learning process, wherein generating the machine-learning process comprises:
training the machine-learning process, iteratively, using the at least one transfer parameter training data correlating the at least one transfer parameter to the time to destination; and
generating the machine-learning process after each iteration of training, wherein the machine learning process is configured to output the time to destination;
updating each score of each transfer path of the plurality of transfer paths as a function of the at least the transfer parameter and the time to destination; and
assigning the fast transfer path to a highest score as a function of the updated scoring;
pair the fast transfer path with the first component;
assign a transfer agent to the fast transfer path as a function of resource data, wherein assigning the transfer agent to the fast transfer path further comprises classifying the transfer agent, wherein classifying further comprises:
generating a resource classifier using a classification algorithm and using resource training data correlating the resource data to transfer agent data;
updating the resource training data and then utilizing the retrained data to generate a plurality of transfer agents as a function of the resource classifier; and
generate a second transfer path to transfer the second component.

2. The system of claim 1, wherein generating the fast transfer path further comprises:
generating an objective function based on a plurality of objectives; and
pairing, with the transfer agent, a predicted transfer path that optimizes the objective function.

3. The system of claim 1, wherein a resource includes a transfer mode.

4. The system of claim 1, wherein assigning the fast transfer path with the transfer agent further comprises:
identifying a plurality of currently active transfer agents including the transfer agent; and
assigning the fast transfer path to the transfer agent.

5. The system of claim 1, wherein the computing device is further configured to display the time to destination of the fast transfer path on the user device.

6. The system of claim 1, wherein the computing device is further configured to display the fast transfer path on the user device.

7. The system of claim 1, wherein:
the plurality of inputs further comprises an expedited option; and
the computing device is further configured to pair the fastest transfer path with the first component and the second component.

8. The system of claim 1, wherein generating the second transfer path further comprises:
selecting the second transfer path from the plurality of transfer paths from the location of the originator to the destination; and
pairing a second transfer agent with the second transfer path.

9. A method for transfer path optimization, the method comprising:
receiving, by a computing device, a plurality of inputs from a user device, wherein the plurality of inputs comprises:
a first component requiring an accelerated delivery;
a second component not requiring accelerated delivery; and
a destination;
generating, by the computing device, a plurality of originators as a function of the plurality of inputs, by identifying originators within a threshold distance relative to the current geographical location of the user device;
generating, by the computing device, a fast transfer path, wherein generating the fast transfer path comprises:
generating a plurality of transfer paths for each originator of the plurality of originators as a function of the destination;
determine a time to destination for each transfer path of the plurality of transfer paths;
ordering each transfer path of the plurality of transfer paths as a function of a respective time to destination;
scoring each transfer path of the plurality of transfer paths as a function of the ordering;
receiving at least one transfer parameter;
generating a machine-learning process, wherein generating the machine-learning process comprises:
training the machine-learning process, iteratively, using the at least one transfer parameter training data correlating the at least one transfer parameter to the time to destination; and
generating the machine-learning process after each iteration of training, wherein the machine learning process is configured to output the time to destination;
updating each score of each transfer path of the plurality of transfer paths as a function of the at least one transfer parameter and the time to destination; and
assigning the fast transfer path to a highest score as a function of the updated scoring;

pairing, by the computing device, the fast transfer path with the first component;

assigning, by the computing device, a transfer agent to the fast transfer path as a function of resource data, wherein assigning the transfer agent to the fast transfer path further comprises classifying the transfer agent, wherein classifying further comprises:

generating a resource classifier using a classification algorithm and using resource training data correlating the resource data to transfer agent;

updating the resource training data and then utilizing the retrained data to generate a plurality of transfer agents as a function of the resource classifier; and generating, by the computing device, a second transfer path to transfer the second component.

10. The method of claim 9, wherein generating the fast transfer path further comprises:

generating an objective function based on a plurality of objectives; and pairing, with the transfer agent, a predicted transfer path that optimizes the objective function.

11. The method of claim 9, wherein a resource includes a transfer mode.

12. The method of claim 9, wherein assigning the fast transfer path with the transfer agent further comprises:

identifying a plurality of currently active transfer agents including the transfer agent; and assigning the fast transfer path to the transfer.

13. The method of claim 9, further comprising displaying the time to destination of the fast transfer path on the user device.

14. The method of claim 9, further comprising displaying the fast transfer path on the user device.

15. The method of claim 9, wherein:

the plurality of inputs further comprises an expedited option; and pairing, by the computing device, the fastest transfer path with the first component and the second component.

16. The method of claim 9, wherein generating the second transfer path further comprises:

selecting the second transfer path from the plurality of transfer paths from the location of the originator to the destination; and pairing a second transfer agent with the second transfer path.

\* \* \* \* \*